United States Patent
Ehrlacher (10) Patent No.: US 8,108,141 B2
(45) Date of Patent: Jan. 31, 2012

(54) INTELLIGENT TRAVEL ROUTING SYSTEM AND METHOD

(75) Inventor: Edward A. Ehrlacher, Philadelphia, PA (US)

(73) Assignee: Empire Technology Development LLC, Wilmington, DE (US)

(*) Notice: Subject to any disclaimer, the term of this patent is extended or adjusted under 35 U.S.C. 154(b) by 673 days.

(21) Appl. No.: 12/200,077

(22) Filed: Aug. 28, 2008

(65) Prior Publication Data

US 2010/0057346 A1 Mar. 4, 2010

(51) Int. Cl.
*G01C 21/26* (2006.01)
*G01C 21/34* (2006.01)

(52) U.S. Cl. ............................. 701/209; 701/210
(58) Field of Classification Search .................. None
See application file for complete search history.

(56) References Cited

U.S. PATENT DOCUMENTS

| | | | |
|---|---|---|---|
| 5,610,821 A * | 3/1997 | Gazis et al. ............ | 455/456.5 |
| 5,878,368 A * | 3/1999 | DeGraaf ................ | 701/209 |
| 5,931,888 A | 8/1999 | Hiyokawa | |
| 6,240,364 B1 | 5/2001 | Kerner et al. | |
| 6,317,685 B1 | 11/2001 | Kozak et al. | |
| 6,385,542 B1 | 5/2002 | Millington | |
| 6,480,783 B1 | 11/2002 | Myr | |
| 6,577,949 B1 | 6/2003 | Robinson et al. | |
| 6,701,250 B1 | 3/2004 | Rychlak | |
| 6,965,325 B2 | 11/2005 | Finnern | |
| 7,463,972 B2 | 12/2008 | Yamada et al. | |
| 7,610,151 B2 | 10/2009 | Letchner et al. | |
| 7,711,475 B1 | 5/2010 | Cona et al. | |
| 7,869,936 B2 * | 1/2011 | Donatelli et al. ............ | 701/118 |
| 2001/0004725 A1 | 6/2001 | Yagyu | |
| 2002/0138196 A1 | 9/2002 | Polidi et al. | |
| 2003/0100326 A1 | 5/2003 | Grube et al. | |
| 2003/0191584 A1 | 10/2003 | Robinson et al. | |
| 2004/0073361 A1 | 4/2004 | Tzamaloukas et al. | |
| 2004/0172191 A1 | 9/2004 | Vitikainen et al. | |
| 2005/0015197 A1 | 1/2005 | Ohtsuji et al. | |
| 2005/0085997 A1 | 4/2005 | Park | |
| 2005/0102098 A1 | 5/2005 | Montealegre et al. | |
| 2005/0288849 A1 | 12/2005 | Rothman et al. | |
| 2006/0015249 A1 | 1/2006 | Gieseke | |

(Continued)

FOREIGN PATENT DOCUMENTS

JP 2004-301667 * 10/2004

(Continued)

OTHER PUBLICATIONS

"Personalized and Adaptive Services on Board a Car: An application for Tourist Information" in Journal of Intelligent Information Systems, 21:3, 249-284, 2003.

(Continued)

*Primary Examiner* — Michael J. Zanelli
(74) *Attorney, Agent, or Firm* — Carlineo, Spicer & Kee, LLC (57) ABSTRACT

A method of assigning routes to a plurality of users includes determining a cost for each of a plurality of roadway segments. The cost of a roadway segment is commensurate with the roadway segment's inclusion in one or more existing routes from a start location to a destination location. The method further includes generating a plurality of new routes. Each generated route includes one or more roadway segments. The generated routes are assigned to each of the plurality of users.

17 Claims, 8 Drawing Sheets

U.S. PATENT DOCUMENTS

| | | |
|---|---|---|
| 2006/0069501 A1 | 3/2006 | Jung et al. |
| 2007/0073480 A1* | 3/2007 | Singh .......................... 701/211 |
| 2007/0088494 A1 | 4/2007 | Rothman et al. |
| 2007/0168118 A1 | 7/2007 | Lappe et al. |
| 2007/0294031 A1 | 12/2007 | Brinton et al. |
| 2008/0051993 A1 | 2/2008 | Graham et al. |
| 2008/0059064 A1 | 3/2008 | Werner et al. |
| 2008/0077309 A1 | 3/2008 | Cobbold |
| 2008/0082264 A1 | 4/2008 | Hill et al. |
| 2008/0103688 A1 | 5/2008 | Chess et al. |
| 2008/0114543 A1 | 5/2008 | Vishnu |
| 2008/0195313 A1 | 8/2008 | Coleman |
| 2008/0262710 A1* | 10/2008 | Li ................................ 701/117 |
| 2008/0294337 A1 | 11/2008 | Dawson et al. |
| 2008/0319661 A1 | 12/2008 | Werner et al. |
| 2008/0320084 A1 | 12/2008 | Godon et al. |
| 2009/0005018 A1 | 1/2009 | Forstall et al. |
| 2009/0005964 A1 | 1/2009 | Forstall et al. |
| 2009/0088971 A1 | 4/2009 | Currie et al. |
| 2009/0119135 A1* | 5/2009 | Schoeman et al. ................ 705/5 |
| 2009/0157312 A1 | 6/2009 | Black et al. |
| 2009/0177386 A1 | 7/2009 | Haase |
| 2009/0182498 A1 | 7/2009 | Seymor |
| 2009/0282124 A1 | 11/2009 | Rauhala et al. |
| 2009/0319172 A1 | 12/2009 | Almeida et al. |
| 2010/0042427 A1 | 2/2010 | Graham et al. |
| 2010/0057340 A1 | 3/2010 | Kravets et al. |

FOREIGN PATENT DOCUMENTS

| | | |
|---|---|---|
| WO | WO02/33355 | 4/2002 |

OTHER PUBLICATIONS

Traffimatics—intelligent co-operative vehicle highway systems. Jan. 21, 2008.

SINTEF—Cooperative Vehicle Infrastructire System, accessed at <http://www.sintef.no/content/page112211.aspx> on Jan. 21, 2008.

Dash Express product information, accessed at <http://dash.net/product.php> on Jan. 22, 2008.

Open Source GPS How to, accessed at <http://www.marengo-ltd.com/gps> on Jan. 18, 2008.

* cited by examiner

INTELLIGENT TRAVEL ROUTING SYSTEM AND METHOD

CROSS REFERENCE TO RELATED APPLICATIONS

This application is related to co-pending U.S. patent application Ser. No. 12/200,096, filed Aug. 28, 2008, entitled Networked Navigation System.

BRIEF DESCRIPTION OF THE DRAWINGS

The following detailed description will be better understood when read in conjunction with the appended drawings, in which there is shown one or more of the multiple embodiments of the present disclosure. It should be understood, however, that the various embodiments of the present disclosure are not limited to the precise arrangements and instrumentalities shown in the drawings.

In the Drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Unified Modeling Language ("UML") can be used to model and/or describe methods and systems and provide the basis for better understanding their functionality and internal operation as well as describing interfaces with external components, systems and people using standardized notation. When used herein, UML diagrams including, but not limited to, use case diagrams, class diagrams and activity diagrams, are meant to serve as an aid in describing the embodiments of the present disclosure, but do not constrain implementation thereof to any particular hardware or software embodiments. Unless otherwise noted, the notation used with respect to the UML diagrams contained herein is consistent with the UML 2.0 specification or variants thereof and is understood by those skilled in the art.

This disclosure is drawn, inter alia, to methods, apparatus, computer programs and systems related to travel route selection technology, and, more particularly, to the dynamic generation of routes for a collection of users with networked navigation and positioning devices. A travel route refers to one or more courses, roads, or road segments that link a start location and a destination location. Given a user seeking a travel route to a destination, the system described herein selects from a plurality of possible routes by considering the current and predicted roadway usage by other users. The system may also consider environmental conditions such as traffic flow, roadway characteristics, weather conditions, and event scheduling. By collecting and aggregating this information, users may be optimally distributed over the plurality of available routes. Optimal distribution in this context is not determined by a single user's travel time; rather, the system will consider the travel time of all users when selecting a route from a plurality of roadway segments. Thus, while the travel time of an individual user may be longer than optimal, this system will ensure that any increase in travel time caused by environmental conditions (e.g., traffic congestion) may be efficiently shared across all other users.

For clarity, some embodiments of the subject matter disclosed herein are described with respect to an automobile and a wireless system. However, in light of the present disclosure those skilled in the art will recognize that the suggested travel routing techniques described herein may be used with any mode of travel and any communication system generally known in the art, including air travel, fixed and mobile computing devices such as a PDA or personal computer, and wireless communication channels such as cellular telephone networks, WiFi and WiMax networks, wired telephone networks, and cable networks.

Figure 1:
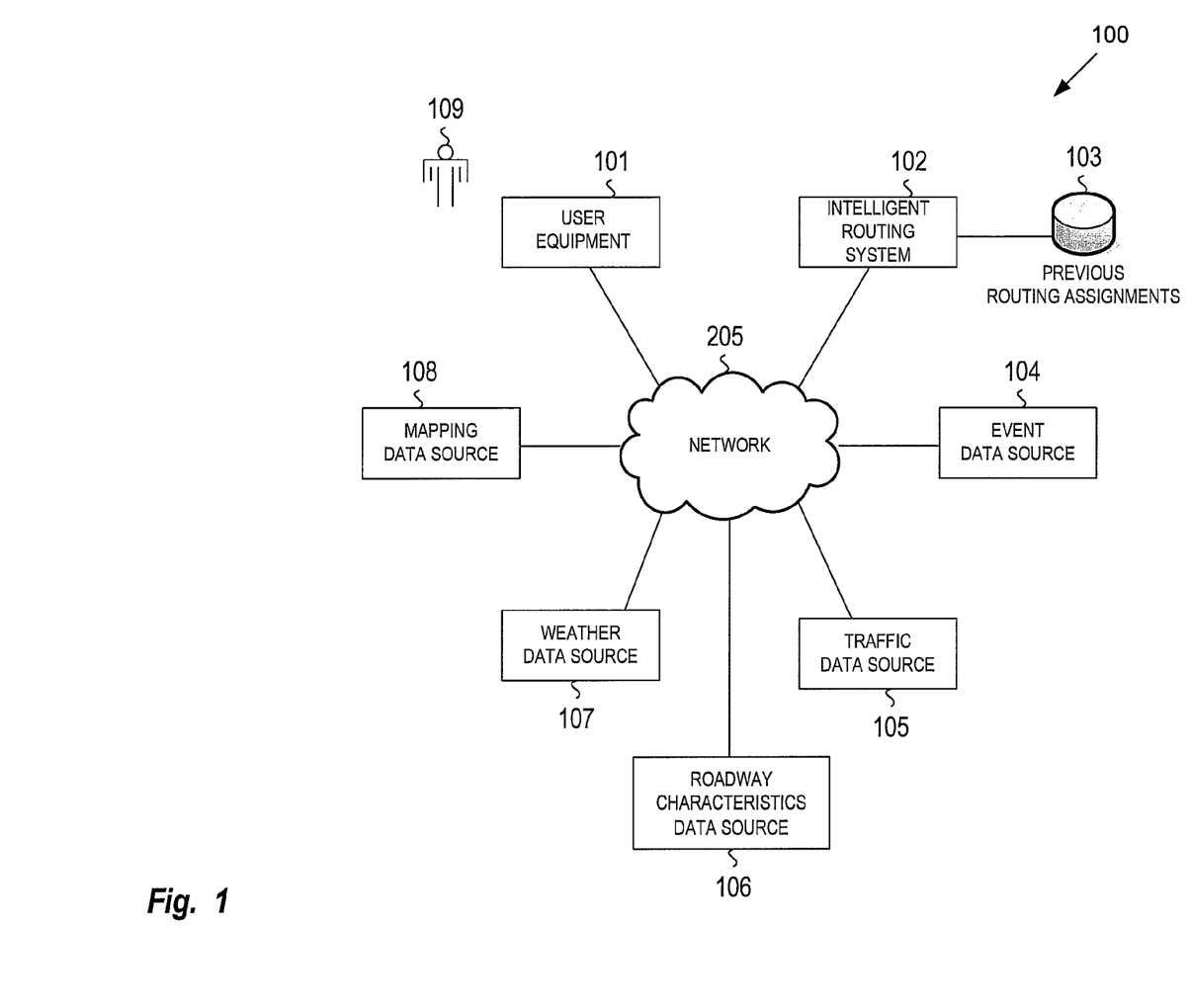
FIG. 1 is a system diagram of a travel routing system according to one embodiment.

Referring to FIG. 1, one embodiment of a travel routing system 100 is shown. The travel routing system 100 includes user equipment 101, an intelligent routing system 102, and external data sources, including an event data source 104, a traffic data source 105, a roadway characteristics database 106, a weather data source 107, and a geographic mapping data source 108. In addition, the intelligent routing system 102 maintains a database of previous routing assignments 103. By combining information from the external data sources 104, 105, 106, 107, 108 and the previous routing assignments database 103, the travel routing system 102 provides an optimal distribution of traffic. In one embodiment, this distribution minimizes the collective travel time of the users of the system.

As shown in FIG. 1, the travel route system 100 includes user equipment (UE) 101. The UE 101 is generally a mobile or fixed communication device. Examples of UE 101 include, without limitation, Personal Digital Assistants (PDA), cell phones (including smart phones), personal computers, and in-vehicle navigation devices (both OEM and after-market). Such communication devices are generally known in the art, and a detailed discussion thereof is omitted here for convenience only and should not be considered limiting. A user 109, such as an operator or vehicle driver, interacts with the UE 101 via a user interface 201 (see FIG. 2) associated with the UE 101, in any manner generally understood in the art (e.g., GUI, keypad, touch-screen).

Figure 2:
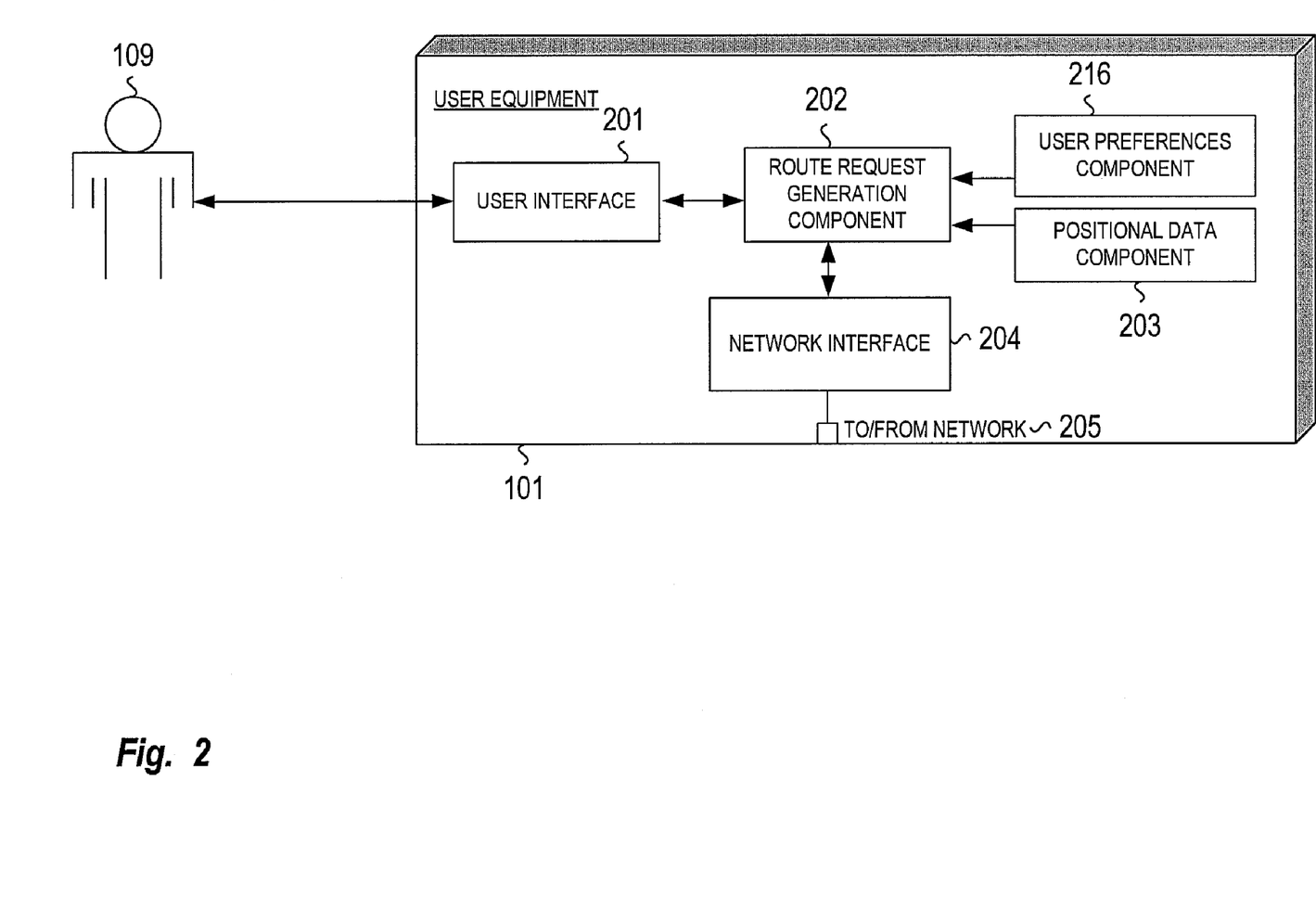
FIG. 2 is a deployment diagram of user equipment according to the travel routing system of FIG. 1.

The UE 101 gathers real-time information about the user 109. This information may include, for example, the user's geographic location, direction, speed, and time. In one embodiment, the UE 101 also collects data which indicates user preferences based on user input or past travel habits. A UE 101 that includes an internal position sensing device may automatically determine the start location based on the current position or location of the user. Such a device may employ any position sensing technique generally known in the art, including, without limitation, Global Positioning System (GPS), cell triangulation, inertial sensing, or some combination thereof. The user 109 may also manually input a start location to the UE.

Referring to FIG. 2, one embodiment of a route request generation component 202 in the UE 101 generates route request messages that are sent to the intelligent routing system (IRS) 102. A route request message may be generated by user input via interaction with the UE 101. The UE 101 may also automatically generate route request messages based on some event (e.g., a user's deviation from an assigned route). A route request message includes information for the IRS 102 to provide directions from the user's current location to a desired destination location. Examples of information incorporated in a route request message include, without limitation, a user identifier, a start location, a destination location, vehicle classification (number of axels, weight, etc.), and toll preferences. In one embodiment the information included in the route request message is gathered from one or more components in the UE 101. For example, in FIG. 2, a positional data component 203 provides data that indicates the user's current location. This component may include, for example, a GPS receiver (not shown). The UE may also contain a user preferences component 216 that supplies one or more user preferences related to past, current, and future route requests by the user 109 and/or the user equipment 101. For example, user preferences may include types of routes preferred by the user, types of roads traveled, preferred vehicle type, preferred time of day for travel, etc. In one embodiment, the route request generation component 202 generates a single message to provide directions between a location and a destination. In another embodiment, the route request generation component periodically sends route requests to the intelligent routing system 102. By regularly requesting a data from the intelligent routing system, a user's route may be modified based on real-time data and the user's updated position. The update interval for such a message may be set by the user via the UE 101 or, alternatively, the UE manufacturer or developer may provide a preset periodic value.

Figure 5:
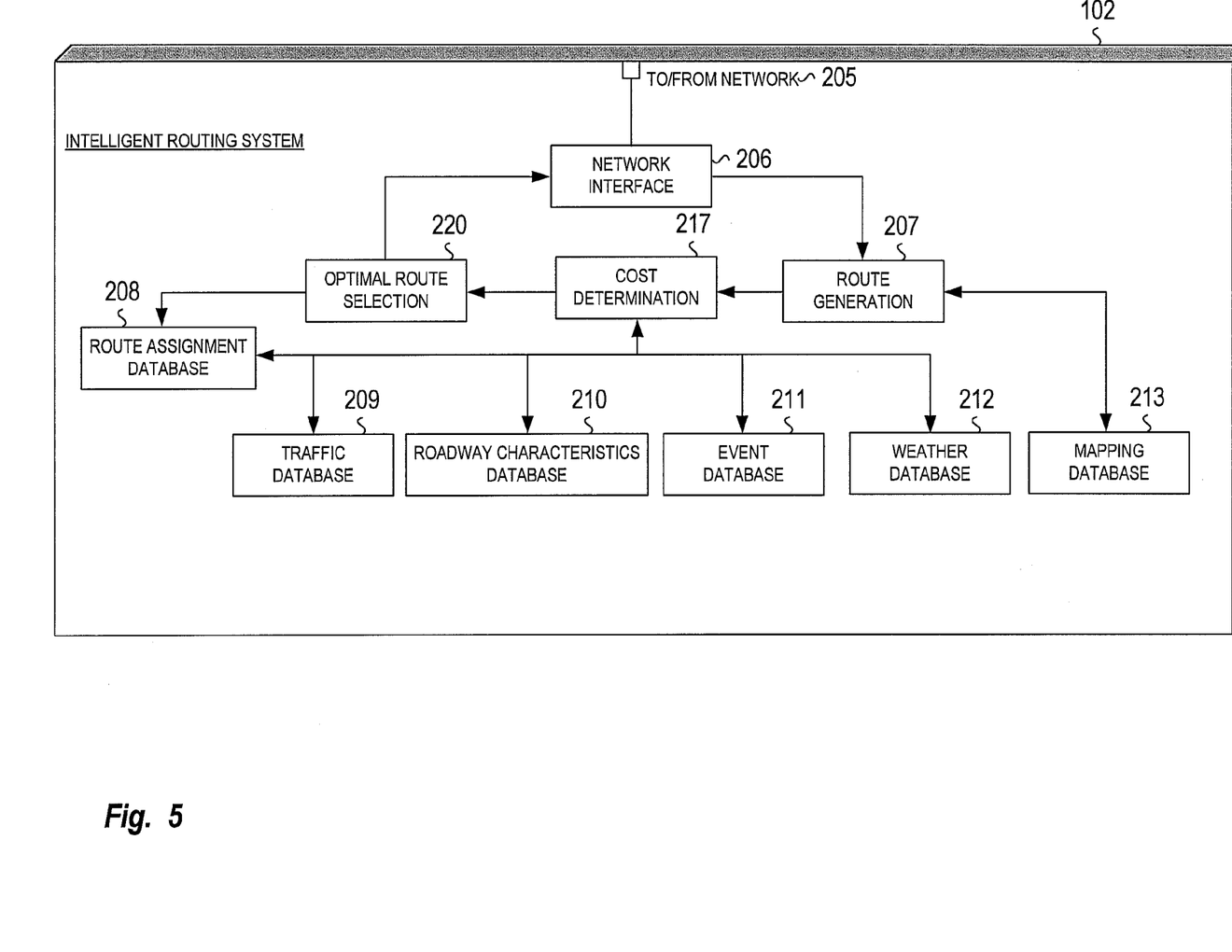
FIG. 5 is a deployment diagram of an intelligent routing system according to the travel routing system of FIG. 1.
Figure 7:
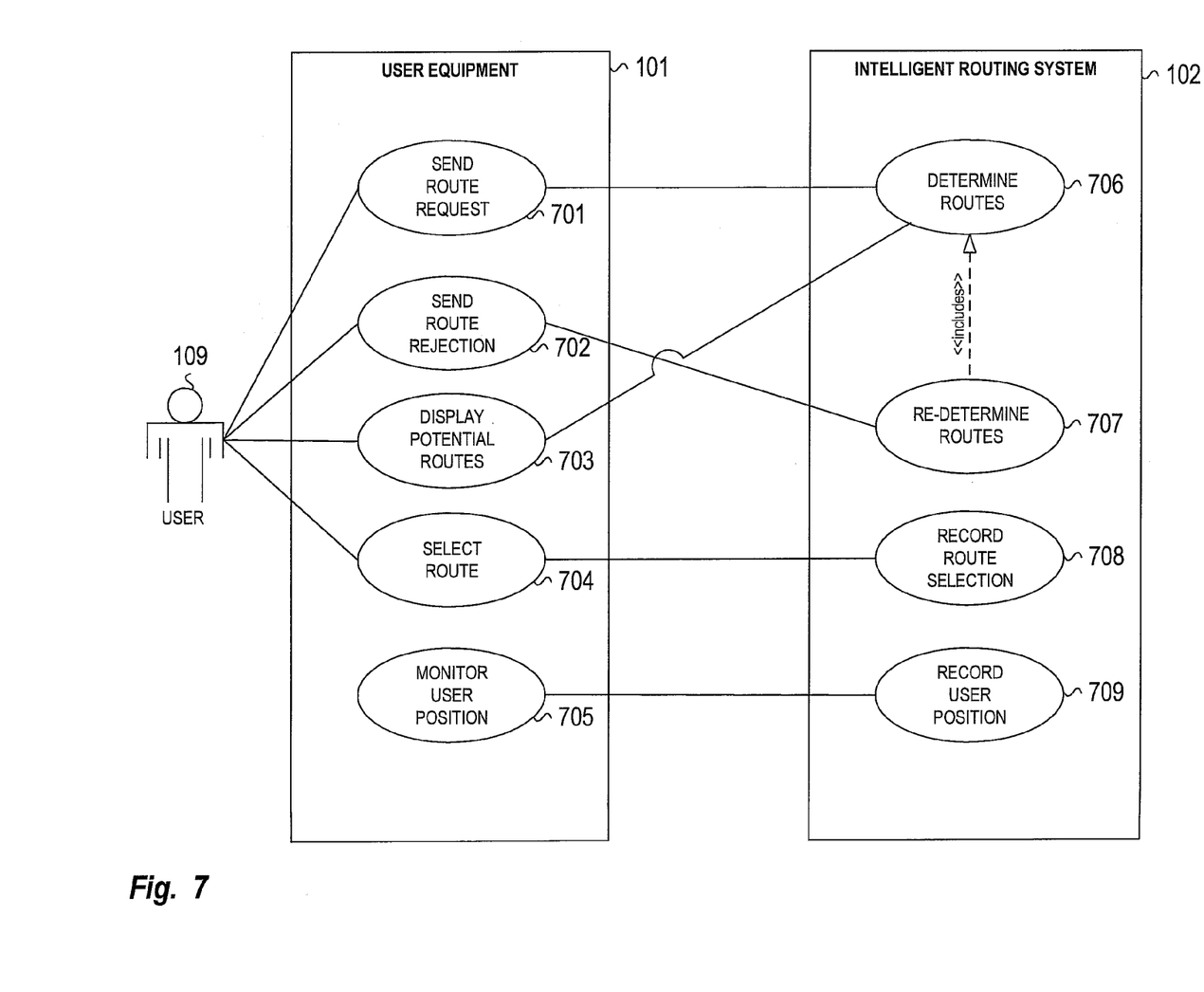
FIG. 7 is a use case diagram of the interaction between user equipment and an intelligent routing system for the travel routing system FIG. 1.

Referring to FIG. 5, one embodiment of the intelligent routing system (IRS) 102 processes route request messages to determine at least one route that links a specified start position and a destination. The IRS compiles environmental data from a plurality of external sources and uses geographic mapping data to generate a list of possible routes that link the specified start position and a destination. Using the environmental data, the IRS 102 provides a cost value to each potential route. The IRS 102 also considers the projected usage level of a route based on previous route assignments. Based on all of these considerations, one or more routes are selected from the list and delivered to the user 109. FIG. 7 shows a use case diagram that reflects a user's 109 interaction with the UE 101 and the interaction of the UE 101 with the IRS 102, according to one embodiment.

In one embodiment, the IRS 102 is co-located within the UE 101. In this embodiment, one user's UE 101 may communicate with the UE 101 of other users to gather data via the network interface 204 and the network 205. In another embodiment, the IRS 102 resides in a location remote from the UE 101, and route request messages are transmitted from the UE 102 to the IRS 102 via the network 205.

The network 205 is used to facilitate communication between the various devices, modules and components of the travel routing system 100. The network 205 may be any network or system generally known in the art, including the Internet, an intranet, a local area network (LAN), a wide area network (WAN), a metropolitan area network (MAN), a direct connection or series of connections, a cable television infrastructure, a cellular telephone network or any other network capable of facilitating communication between the devices, modules and other components of the travel routing system 100. The network maybe wired, wireless or a combination thereof. Wired connections may be implemented using Ethernet, Universal Serial Bus (USB), RJ-11 or any other wired connection generally known in the art. Wireless connections may be implemented using wifi, wimax, bluetooth, infrared, cellular networks, satellite or any other wireless connection methodology generally known in the art. The network maybe implemented in a client-server, token-ring, peer-to-peer manner or any other network topology known in the art. Additionally, several networks may work alone or in communication with each other to facilitate communication in the network 205.

Figure 6:
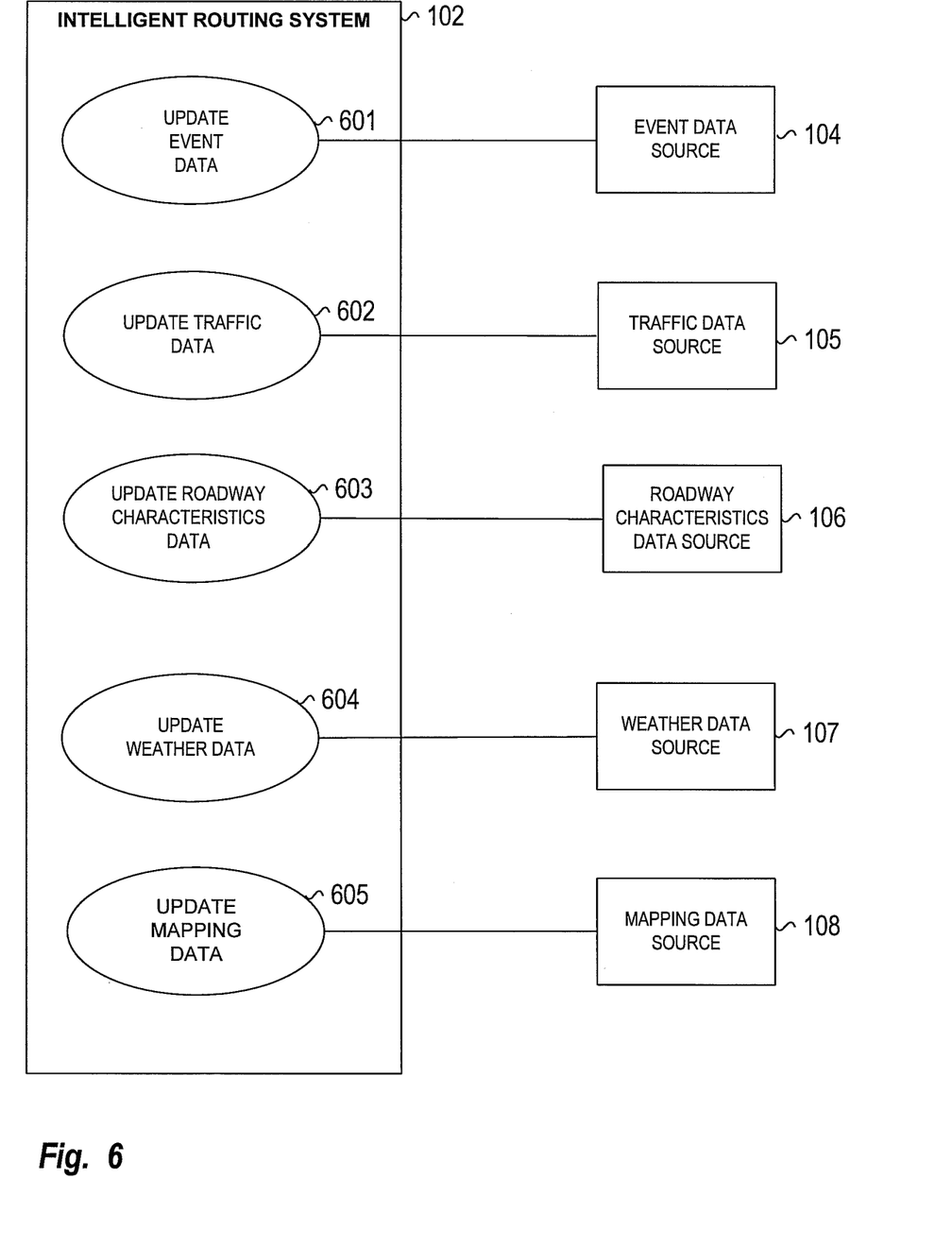
FIG. 6 is a use case diagram associated with updating environmental data for the travel routing system FIG. 1.

The IRS 102 compiles environmental data from any device or network location capable of providing access to data that may be relevant to providing routing information to a user 109. Examples of data sources employed by the IRS 102 include, without limitation, the event data source 104, the traffic data source 105, the roadway characteristics data source 106, the weather data source 107, and the geographic mapping data source 108. The IRS 102 may request data from an external data source or the source may automatically send data to the IRS 102 at predefined or periodic intervals. Also, the IRS 102 can be updated with data stored on a storage medium. For example, the IRS 102 my obtain stored data from a floppy or hard magnetic disk, a magnetic tape, an optical disk such as a CD, CD-ROM, DVD, a flash memory device, or any other type of media generally known in the art that is capable of retaining digital data used for some interval of time. Data gathered from external sources may also be stored locally inside the IRS 102. In particular, environmental data gathered from the external sources 105, 106, 104, 107, 108 is stored by the IRS 102 in one or more databases 209, 210, 211, 212, 213. Referring to the use case diagram of FIG. 6, in this example use cases associated with updating each of these external sources are shown in 601, 602, 603, 604 and 605 as interacting with their respective data sources, 104, 105, 106, 107, 108.

The event data source 104 provides information related to events that are currently impacting traffic conditions or events that may impact traffic conditions in the future. Examples of an event or event type include, but are not limited to, sports events, concerts, political rallies, emergency events, such as a building fires or floods, terrorist acts, and community events such as street festivals or parades, and religious services. Information about an event may include the venue for the event, a start time for the event, an end time (either projected or actual), expected or actual attendance, and roadway closures and restrictions associated with the event. Data received from the event data source 104 may be stored in an event database 211 local to the IRS 102.

The traffic data source 105 provides information related to the real-time or near real-time traffic conditions on roadways, road segments, parking areas or any other area where traffic flow or volume is impacted and/or observed. This information may include congestion levels on roadways or portions thereof, traffic flow or rate of vehicle movement, a description of current road closings, bridge and railroad gate openings, accident reports, and an indication of police activity of the roadway. In addition to current traffic information, the traffic data source may provide historical traffic data and predictions of future traffic conditions. Potential sources of traffic data include, without limitation, government agency data, roadway observations from cameras or sensors, or Internet-based traffic data aggregators. Alternatively, the IRS 102 may record traffic data as it receives it, so that it maintains a record of historical traffic conditions. The IRS 102 may then forecast traffic conditions based on locally executed algorithms. A traffic database 209 in the IRS 102 may store information received from the traffic data source 105 as well as traffic data which is generated by the IRS 102.

The roadway characteristics 106 data source provides information related to the physical characteristics of roadways, road segments, parking areas or other areas that are traversed by vehicles. This information may include, without limitation, the speed limit of each roadway, the number of lanes on the highway, exit destinations and merging roadways, weight limitations, toll locations, and capacity. The roadway characteristics database may also store information that indicates whether traffic on a roadway is controlled or uncontrolled (e.g., whether lane markings and traffic control signals are employed). Roadway characteristics may be stored in a roadway characteristics database 210 in the IRS 102.

The weather data source 107 provides real-time or near real-time data related to current and historical weather conditions, as well as a prediction of future weather conditions, including radar and satellite data, temperature, wind and other generally observed weather conditions. Weather events tracked by the weather data source 107 include, without limitation, rain, tornados, hail, snow, ice, thunderstorms and hurricanes. The weather data source may also provide an indication of natural disasters such as avalanches, earthquakes, floods, tsunamis, volcanic eruptions, landslides, and mudslides. If a weather event is currently occurring, the weather data source 107 may provide an indication of the location of the event, as well as an indication of locations that will be impacted in the future. The IRS 102 may compile and store the weather data in a weather database 212.

Geographic mapping data may be gathered from one or more mapping data sources 108 that provide mapping data that describes a plurality of roadways as well as the location of major landmarks. Roadways that are specified in the data may include, without limitation, interstate highways, intrastate highways, local roads, and residential streets. Each roadway may be described as single item or a roadway may be partitioned into one or more road segments (i.e., any section of a roadway that is utilized by travelers). Road segments may be further described by suggested usage. For example, a road segment that is a portion of a major highway may be described as usable by vehicles, but not pedestrians. Landmarks included in the mapping data may aid in the prediction of increased traffic conditions. Such landmarks may include, without limitation, police and fire stations, amusement parks, arenas, stadiums, parks, restaurants, shopping malls, and churches. The geographic mapping may be stored in mapping database 213 in the IRS 102.

Route request messages received from the UE 101 are parsed by the IRS 102 to retrieve a user's specified start location and desired destination location. The mapping database 213 is queried by a route generation component 207 to determine one or more potential routes that link the start and destination locations. The relationship between a route request in the UE 101 and the initiation of route selection in the IRS 102 is illustrated by send route request use case 701 and determine routes use case 706, respectively (see FIG. 7). A route includes one or more road segments and may be distinguished from other routes through the inclusion or exclusion of one or more road segments.

In one embodiment, every potential route linking the start location and the destination location is retrieved from the mapping database 213. In other embodiments, a subset of the complete set of available routes is selected based on factors such as distance, average speed limit, or toll charges. A user's preference for a particular type of road may also be considered. For example, a user may specify that only highways should be included in a proposed route.

The IRS 102 includes a cost determination component that determines a cost associated with each road segment included in the route list. This cost is a measure of the impact to optimal system performance associated with assigning a road segment to a new route. Note that cost is not user-specific; rather, the assignment's effect on all users is considered. The cost of a roadway segment is represented by one or more numerical values that are assigned on a set scale for the system. In one embodiment, cost is a function of two factors: the number of user routes affected by an assignment and the increase in travel time for each user affected. The IRS 102 may use current cost and other relevant information to forecast future cost values on road segments that could be included in a route. By considering projected cost, the IRS 102 can efficiently create routes even if a roadway segment will not be traversed in the near future.

A road segment's cost is related to its capacity, or the number of vehicles that can simultaneously travel the length of the road segment at the segment's posted speed limit. Cost increases as the number of vehicles simultaneously using the road segment increases. When the number of vehicles approaches capacity, cost may asymptotically rise. At this point, one or more users may need to be rerouted and any new routes would not include that road segment. The IRS 102 will attempt to distribute traffic in a manner that prevents roadways from reaching their capacity levels. This may entail routing a certain number of users along the road segment, while other users are routed via alternate segments.

Aside from capacity, environmental conditions such as vehicle accidents, weather conditions, and event occurrences may also impact the cost of a road segment. Thus, the IRS 102 uses information from each available source of environmental data to further refine the cost of each road segment included in the route list. The cost of a particular road segment may be increased to reflect an increased level of actual or projected traffic congestion. For example, if a major vehicle accident occurs on a particular road segment, the cost for that road segment and nearby segments will increase. As a result, when selecting a new route, the IRS 102 may route users around the accident area. For users that are in-transit on a previously generated route, the IRS 102 may reroute those users before they encounter the accident area or even residue local traffic congestion due to the accident. Information that may be considered in formulating new routes may include the final destination of the user, current and forecast traffic flows along the possible alternate routes, capacity of the road segments in alternate routes, and the expected duration of increased congestion level. It should be noted that, based on an analysis of the increased congestion levels, the IRS 102 may direct a certain number of users directly through the accident area, assuming that it is not completely blocked and it has some capacity for additional traffic.

In addition, the IRS 102 may review the routes of other users when calculating cost for a list of proposed routes, as the planned routes of other users provides an indication of the future cost of a road segment. For example, if the IRS 102 determines that many users will be routed along a particular road segment during a particular time interval, the IRS 102 may distribute other users along other available roadways during that time interval. Moreover, cost can be efficiently distributed over a plurality of roadways by allocating road segments appropriately.

Once the cost of each road segment has been determined by the IRS, the IRS 102 determines a route cost for each route included in the route list. In one embodiment, each route includes one or more roadway segments and route cost is calculated by summing the cost associated with each roadway segment. In another embodiment, one or more user preferences are considered in addition to the roadway segment costs. For example, the IRS 102 may consider routes followed by the user in the past to appropriately weight the cost of each new route. Once a cost for each route is determined, the route list may be ordered by route cost.

Figure 3:
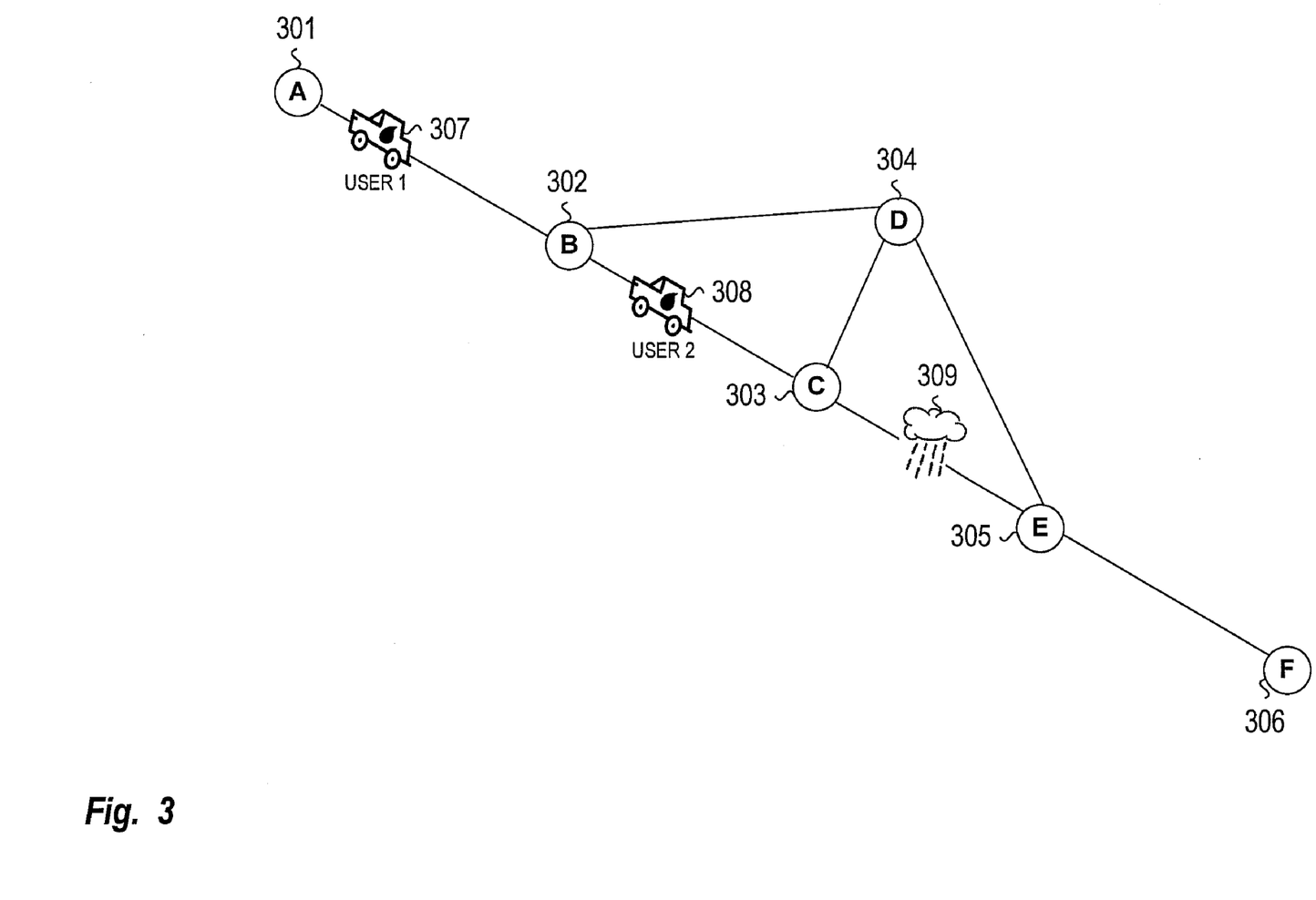
FIG. 3 is an example of a routing technique performed by the travel routing system of FIG. 1.

The IRS 102 may also consider the destination location of the user in calculating route cost. More specifically, the IRS 102 may determine the detriment associated with not providing a user with a particular route. For example, for a user traveling a relatively short distance between two points, it may be more efficient to provide the user with the shortest route between two points. This may be a single roadway segment. If another user is on much longer trip, the IRS could reroute that user because the diversion would be less noticeable over the longer travel time. For example, in FIG. 3 a first user 307 is traveling from point A 301 to point F 106, while a second user 308 is traveling from point B 302 to point E 305. Both users 307, 308 could traverse the C-E roadway segment; however, the IRS 102 may determine that the first user's route is long when compared with the second user 308. Moreover, the IRS may note that there is a storm 309 on roadway segment C-E that may limit the flow of traffic along that portion. Thus, the first user 307 could be diverted to point D 304 and then to E 305, thus avoiding the C-E roadway segment altogether.

Without further processing of the route list, each user may be directed to use the route with the lowest overall route cost. As many users proceed along this route, it may become congested, thus increasing the true travel time for the user. Meanwhile, there may be one or more road segments that remain under utilized or not utilized at all because routes containing those segments are ranked lower in route or segment cost on the list. These lower ranked routes may entail a slight increase in the travel time based solely on the external conditions as they existed at the time the list was created. Yet, as users begin using the higher ranked route(s), the lower ranked routes and segments will start to have lower true travel times.

To alleviate the problem of underutilization or non-utilization of routes and roadway segments, an optimal route selection component 220 of the IRS 102 efficiently distributes available routes and road segments over the users of the travel routing system 100. The optimal route selection component 220 may distribute roadway segments randomly or by utilizing an algorithm such as round-robin; First In, First Out (FIFO); Last In, First Out (LIFO); or priority-based selection. Those skilled in the art in light of the present disclosure will appreciate that other distribution algorithms may be employed as well.

Figure 8:
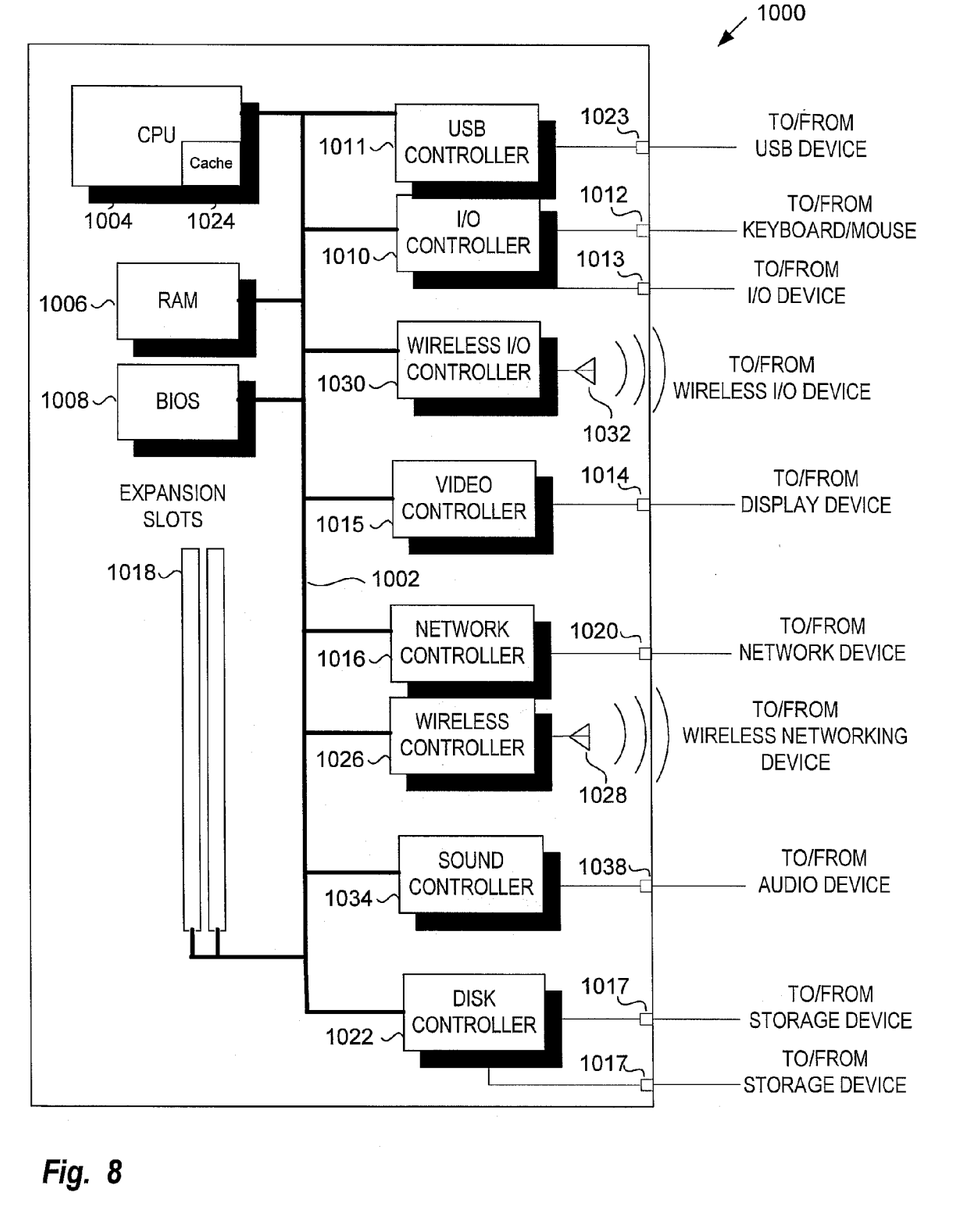
FIG. 8 is a block diagram of a computer system through which the embodiments of the present disclosure may be implemented.

FIG. 8 is a block diagram of a computer architecture or system 1000 through which the embodiments of the travel routing system 100, including the intelligent routing system 102, may be realized and/or implemented. A system bus 1002 transports data amongst the Central Processing Unit (CPU) 1004, RAM 1006, the Basic Input Output System (BIOS) 1008 and other components. The CPU 1004 may include a cache memory component 1024. The computer system 1000 may include one or more external storage ports 1017 for accessing a hard disk drive, optical storage drive (e.g., CD-ROM, DVD-ROM, DVD-RW), flash memory, tape device, or other storage device (not shown). The relevant storage device (s) are connected through the external storage port 1017 which is connected to the system bus 1002 via a disk controller 1022. A keyboard and pointing device (e.g. mouse. touch pad) (not shown) can be connected to the keyboard/mouse port(s) 1012, and other I/O devices could be connected to additional I/O port(s) 1013, which are connected to the system bus 1002 through the I/O controller 1010. Additional ports or devices, such as serial ports, parallel ports, firewire adapters, or biometric devices (not shown), may be utilized through the I/O controller 1010. A display device (not shown) can be connected to a display device port 1014 which is connected to the system bus 1002 through the video controller 1015. A network device (not shown), including but not limited to an Ethernet device or other device having networking capability, can be connected to a network port 1020 which is connected through the network controller 1016 to the system bus 1002. The computer system 1000 may be wirelessly connected to a network device that is configured for wireless operation (not shown), including but not limited to wireless routers, using an antenna 1028 connected to a wireless controller 1026 connected to the system bus 1002, where the antenna transmits/receives signals to/from the network device. The computer system 1000 may include one or more USB ports 1023. A USB device (not shown), including but not limited to a printer, scanner, keyboard, mouse, digital camera, storage device, PDA, cellular phone, biometric device, webcam, and I/O adapters can be connected to the USB port 1023 which is connected to the system bus 1002 through the USB controller 1011. Other devices, such as cellular phones, PDAs, and other portable devices may also be connected wirelessly via a wireless I/O antenna 1032 that is connected to a wireless I/O controller 1030. Examples of wireless I/O technologies include, but are not limited to, Bluetooth, Infrared (IR), and Radio-Frequency (RF). Audio devices, such as microphones, speakers, or headphones may be connected to a sound port 1038 that is connected to a sound controller 1034 that is connected to the system bus 1002. Expansion slots 1018 can be comprised of Industry Standard Architecture (ISA) slots, Peripheral Component Interconnect (PCI) expansion slots, PCI Express expansion slots, Accelerated Graphics Port (AGP) slots or any other slot generally known in the art to allow additional cards to be placed into the computer system 1000. These slots can be used to connect network cards, video cards, sound cards, modems and any other peripheral devices generally used with a computer. The computer system 1000 also includes a source of power (not shown), including but not limited to a power supply connected to an external source of power, and an internal or external battery. Detailed descriptions of these devices have been omitted for convenience only and should not be construed as limiting.

The IRS 102 may also adjust a route based on the intended route of one or more nearby users. For example, an accident on a roadway may impact many vehicles located on that roadway. Vehicles traveling on the roadway may become stopped or slowed as congestion rises on the roadway. Moreover, well-known alternate routes will also quickly become congested as drivers seek to avoid the affected roadway. To provide for more efficient re-routing of drivers, vehicles can communicate with one another to optimally route the traffic.

Following this technique, the intended destination of each driver may be considered along with other relevant environmental conditions.

Once the IRS 102 determines a route for a user, a route message is sent from the IRS 102 to the UE 101. This message may contain only the top-ranked route or it may contain the top-ranked route, along with one or more secondary route choices. These secondary route choices allow the user to select an alternative to the top-ranked route presented by the user. In the display potential routes use case 703 (see FIG. 7), the user equipment 101 interacts with the determine routes use case 706 of the IRS 102 to display the routes to the user 109. Routes may be displayed to user via the UE 101 using any technique understood in the art. For example, routes may be listed in text format or they may appear graphically highlighted on a map.

The user 109 may reject all routes presented by the IRS 102 by providing an indication to the user's equipment 101. After receiving a rejection indication, the UE 101 sends a new route request message to the IRS 102. The IRS may then regenerate an optimal route for the user, considering the routes previously rejected by the user. Thus, the send route rejection use case 702 interacts with the re-determine routes use case 707 of the IRS 102 to produce a new route list. Alternatively, the IRS 102 may simply consult the ranked route list previously generated for the user and select a new optimal route. The IRS can continue to generate routes for the user until the user's equipment indicates that the route suggested by the IRS is being followed by the user.

The user may select a route either by providing an indication to the UE 101, or the UE 101 may monitor the user's position to determine that the route is being followed. After the UE 101 determines that the user has selected the route, it sends a message to the IRS 102 so that the IRS 102 may consider the user's selected route when making future routing decisions. Accordingly, the select route use case 704 provides the user's selection to the record route selection use case 708. The user's selection is thus recorded by the IRS. Additionally, the UE 101 may continue to monitor the user's position in monitor user position use case 705 and periodically provide updates to the IRS 102 in record user position use case 709.

Figure 4:
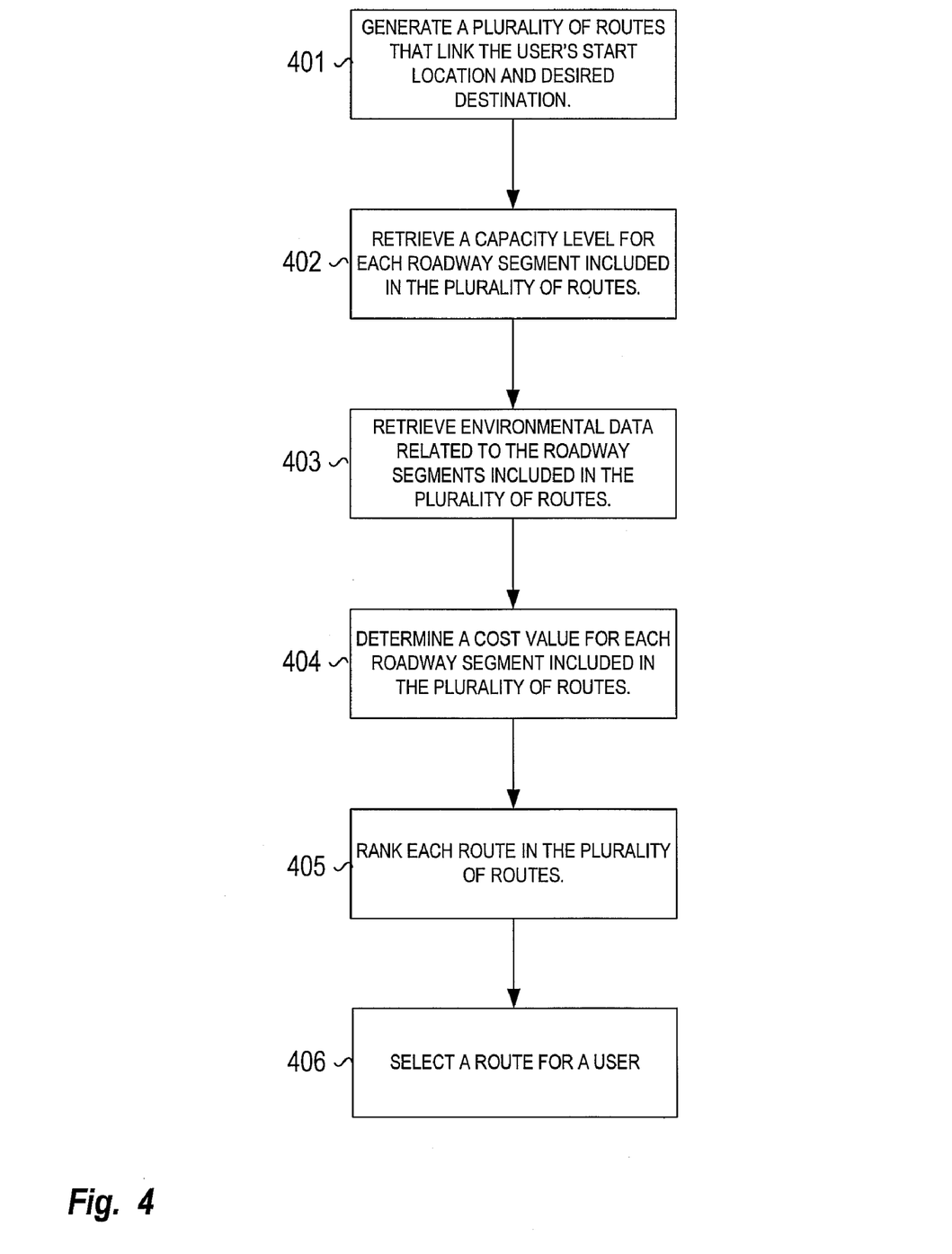
FIG. 4 is a flow diagram for selecting a route for a user.

The flow chart of FIG. 4, showing steps 401, 402, 403, 404, 405, 406, reflects one embodiment of the process of generating a route for a user as described herein.

The efficiency of the IRS 102 is determined, in part, by the amount of data that it uses to make routing decisions. As explained above, one of the sources of data for the IRS 102 is previous routing assignments to other users. By considering which road segments will be used in the near future, the IRS can efficiently distribute roadway segments when developing new routes.

It may be problematic, however, if there are multiple routing service providers, with each service provider maintaining an independent IRS-type system. Under this scenario, a service provider's IRS may consider route assignments for that provider's users, while ignoring the planned routes of users of other routing service providers. To alleviate this problem and enhance the routing selection capabilities of each IRS, data may be shared between providers and individual IRSs. Providers may exchange data using any method of data transfer generally known in the art. For example, each IRS may automatically send a routing report at regular intervals to other IRS units.

Data may also be shared among a plurality of user equipment (UE) components. In one embodiment, the IRS 102 is co-located with the UE 101. In this embodiment, there may be no centralized routing service provider; rather, each user independently makes routing decisions. The UE 101 may communicate with the equipment of other users via a peer-to-peer connection. Information may be gathered from external sources as well as other users in the area. By considering the destination of nearby users, utilization of local roadways can be maximized.

UE devices may communicate with each another via a wireless connection. Examples of potentially suitable wireless network types include, without limitation, Cellular Digital Packet Data (CDPD), High Speed Circuit Switched Data (HSCSD), Packet Data Cellular (PDC-P), General Packet Radio Service (GPRS), 1× Radio Transmission Technology, (1×RTT), Bluetooth, Infrared Light Transmission (IrDA), Multichannel Multipoint Distribution Service (MMDS), Local Multipoint Distribution Service (LMDS), Worldwide Interoperability for Microwave Access WiMAX, and IEEE 802.11 Wi-Fi.

User equipment may provide updated positional coordinates to the intelligent routing system. The system can use these coordinates to monitor if the user is following the suggested route. If the route is not being followed, the IRS may update the routing information provided to the user equipment.

In one embodiment, the IRS does not return a complete route to the user. Instead, dynamic turn by turn directions are delivered to the user in near-real time based on all data available the intelligent routing engine. This might be particularly useful in an urban setting where quickly changing traffic patterns could be detected using GPS or other position data (e.g., inertial sensing or cell triangulation). In the context of vehicle-based systems, incorporating traffic signal timing data could provide most efficient paths between origin and destination locations that are relatively close to each other for a large number of vehicles traversing the same roadways.

In a peer to peer network of GPS-enabled navigation systems, dynamic turn by turn directions can be delivered by monitoring the routes being provided to other users within the immediate vicinity and anticipating the expected utilization of those routes. For example, if many vehicles indicate that they will make a left turn at the same intersection, a vehicle may be directed to turn in advance of that intersection or even directed to a turn past the intersection to avoid a lengthy wait.

The embodiments of the present disclosure may be implemented with any combination of hardware and software. If implemented as a computer-implemented apparatus, the embodiment is implemented using means for performing all of the steps and functions described above.

The embodiments of the present disclosure can be included in an article of manufacture (e.g., one or more computer program products) having, for instance, computer useable media. The media has embodied therein, for instance, computer readable program code means for providing and facilitating the mechanisms of the embodiments of the present disclsoure. The article of manufacture can be included as part of a computer system or sold separately.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed:

1. A computer-implemented method of assigning routes to a plurality of users, the method comprising:
   determining a cost for each of a plurality of roadway segments, wherein the cost of a roadway segment is commensurate with the roadway segment's inclusion in one or more existing routes from a first start location to a first destination location;
   generating a plurality of new routes from a second start location to a second destination location, wherein each new route comprises one or more roadway segments included in the plurality of roadway segments;
   receiving a user preference from each of the plurality of users; and
   assigning each of the plurality of users one or more of the new routes based on the received user preferences and the cost of the roadway segments comprising the plurality of new routes.

2. The method of claim 1, further comprising:
   updating the cost for each of the plurality of roadway segments based on the plurality of new routes; and
   modifying the one or more existing routes based on the updated cost.

3. The method of claim 1, further comprising:
   providing the assigned new routes to the plurality of users.

4. The method of claim 1, wherein the assigning each of the plurality of users is performed by at least one of:
   selecting a new route at random from the plurality of routes;
   selecting a new route from the plurality of routes based on a user priority level; and
   selecting a new route from the plurality of routes based on a round robin selection scheme.

5. The method of claim 1, wherein the cost of a roadway segment is further commensurate with at least one of:
   traffic levels on the roadway segment;
   characteristics of the roadway segment;
   weather conditions on the roadway segment; and
   events that may impact traffic levels on the roadway segment.

6. The method of claim 1, wherein the existing routes are determined by contacting one or more other users via a peer-to-peer connection.

7. A computer-implemented method for selecting a route for a user, the method comprising:
   determining a cost for each of a plurality of road segments, wherein the cost of a road segment is commensurate with an increase in collective travel time associated with assigning the roadway segment to a new route;
   receiving a new route request message, wherein the new route request message comprises a start location and a destination location;
   generating a plurality of routes that link the start location and the destination location, wherein each route in the plurality of routes comprises one or more of the plurality of road segments;
   determining a route cost for each route in the plurality of routes;
   selecting a new route for a user from the plurality of routes;
   receiving an indication that the user is following the new route; and
   selecting a secondary route for the user.

8. The method of claim 7, further comprising:
   providing the new route to a user device for display to the user.

9. The method of claim 7 further, comprising:
   providing the user with the secondary route.

10. The method of claim 7, wherein the selecting a new route from the plurality of routes is performed by at least one of:
    selecting a new route at random from the plurality of routes;
    selecting a new route from the plurality of routes based on a user priority level; and
    selecting a new route from the plurality of routes based on a round robin selection scheme.

11. The method of claim 7, wherein the route cost is a sum of the cost of the one or more of the plurality of roadway segments comprising the route.

12. The method of claim 7, wherein the route cost comprises:
    a sum of the cost of the one or more of the plurality of roadway segments comprising the route; and
    a weighting factor commensurate with one or more user preferences.

13. The method of claim 7, wherein the method further comprises:
    modifying one or more existing routes based on the selection of the new route.

14. The method of claim 7, wherein the cost of a roadway segment is further commensurate with at least one of:
    traffic levels on the roadway segment;
    characteristics of the roadway segment;
    weather conditions on the segment; and
    events that may impact traffic levels on the roadway segment.

15. The method of claim 7, wherein the start location (c) is determined using a Global Positioning System (GPS) component included in a user device.

16. The method of claim 7, wherein the cost is determined by contacting one or more other users via a peer-to-peer connection.

17. A system for assigning routes to a plurality of users, the system comprising:
    a cost determination component configured to determine a cost for each of a plurality of roadway segments, wherein the cost of a roadway segment is commensurate with the roadway segment's inclusion in one or more existing routes from a first start location to a first destination location;
    a route generation component configured to generate a plurality of new routes from a second start location to a second destination location, wherein each new route comprises one or more roadway segments included in the plurality of roadway segments;

a receiver unit configured to receive a user preference from each of the plurality of users; and a route assignment component configured to assign each of the plurality of users one or more of the new routes based on the received user preferences and the cost of the roadway segments comprising the plurality of new routes.

* * * * *

UNITED STATES PATENT AND TRADEMARK OFFICE
CERTIFICATE OF CORRECTION

PATENT NO. : 8,108,141 B2
APPLICATION NO. : 12/200077
DATED : January 31, 2012
INVENTOR(S) : Ehrlacher It is certified that error appears in the above-identified patent and that said Letters Patent is hereby corrected as shown below:

On Title Page 2, in Item (56), under "OTHER PUBLICATIONS", in Column 2, Line 3, delete "Infrastructire" and insert -- Infrastructure --, therefor.

In Column 2, Line 54, delete "(PDA)," and insert -- (PDAs), --, therefor.

In Column 8, Lines 9-10, delete "mouse. Touch pad)" and insert -- mouse, Touch pad) --, therefor.

In Column 10, Line 54, delete "disclsoure." and insert -- disclosure. --, therefor.

In Column 14, Line 20, in Claim 9, delete "claim 7 further," and insert -- claim 7, further --, therefor.

In Column 14, Line 51, in Claim 15, after "location" delete "(c)".

Signed and Sealed this
Eighteenth Day of September, 2012

David J. Kappos
*Director of the United States Patent and Trademark Office*